United States Patent [19]

Gyarmati et al.

[11] 3,833,470

[45] Sept. 3, 1974

[54] METHOD OF MAKING FUEL AND FERTILE ELEMENTS FOR NUCLEAR-REACTOR CORES

[75] Inventors: Ernö Gyarmati; Hubertus Nickel, both of Julich, Germany

[73] Assignee: Kernforschungsanlage Julich Gesellschaft mit beschrankter, Haftung, Julich, Germany

[22] Filed: May 3, 1972

[21] Appl. No.: 250,032

Related U.S. Application Data

[62] Division of Ser. No. 49,056, June 23, 1970, abandoned.

[30] Foreign Application Priority Data

June 27, 1969 Germany............................ 1932567

[52] U.S. Cl..................... 176/68, 176/67, 176/91 R, 176/91 SP, 264/0.5

[51] Int. Cl...... G21c 3/70, G21c 3/26, G21c 21/02

[58] Field of Search............ 176/44, 45, 46, 47, 67, 176/59, 68, 91, 91 SP; 264/0.5

[56] References Cited

UNITED STATES PATENTS

| | | | |
|---|---|---|---|
| 3,287,910 | 11/1966 | Silverstein | 176/45 |
| 3,368,946 | 2/1968 | Jenssen | 176/59 |
| 3,480,702 | 11/1969 | Ford et al. | 176/91 R |
| 3,669,832 | 6/1972 | Boettcher | 176/91 R |

*Primary Examiner*—Leland A. Sebastian
*Assistant Examiner*—Roger S. Gaither
*Attorney, Agent, or Firm*—Karl F. Ross; Herbert Dubno

[57] ABSTRACT

Fissionable-fuel or fertile elements for the core of a nuclear reactor, especially a reactor of the gas-cooled type, wherein the fuel or fertile material is introduced into graphite shells in the form of coated particles and a pyrolytically decomposable carbon-containing or silane gas is passed upwardly through the shell while the mass therein is heated by displacing an induction-furnace core downwardly around the graphite shell thereby bonding the coated particles together with pyrolytic carbon, silicon carbide or zirconium carbide being formed in situ to yield a coherent mass with a porosity of, say, 10 to 25 percent. The gas is preferably a mixture of one or more inert gases (nitrogen, argon or helium) with one or more hydrocarbons or carbon-containing gases (e.g., methane, acetylene, benzene, or silanes).

3 Claims, 3 Drawing Figures

METHOD OF MAKING FUEL AND FERTILE ELEMENTS FOR NUCLEAR-REACTOR CORES

CROSS-REFERENCE TO RELATED APPLICATION

This application is a division of Ser. No. 49,056 filed June 23, 1970 now abandoned.

FIELD OF THE INVENTION

Our present invention relates to fissionable-fuel or fertile elements for use in the core of a nuclear reactor; more particularly the invention relates to the operation of nuclear reactors with particulate fuels and fertile materials.

BACKGROUND OF THE INVENTION

It has been proposed heretofore to operate nuclear reactor cores with fissionable-fuel elements of the coated-particle type and to operate breeder reactors with fuel elements of this character and/or coated-particle fertile materials.

In coated-particle technology the active material in the reactions of the core, e.g., the neutron-emitting fissionable-fuel or the neutron-irradiated fertile material, is encased in substantially fluid impenetrable sheaths or coating of a ceramic or a material, e.g., pyrolytically deposited graphite or carbon, having refractory properties. Ceramic coatings of silicon carbide, zirconium carbide, niobium carbide, etc. and refractory oxides such as beryllia, alumina, magnesia and zirconia are typical as noted in the JOURNAL OF NUCLEAR MATERIALS, Vol. II, pages 1 to 31 (1964). See also commonly owned applications Ser. No. 731,791, filed May 24, 1968 (Now U.S. Pat. No. 3,565,762) and Ser. No. 888,819 filed Dec. 29, 1969 (now abandoned).

The particles may be made with coatings as described in this publication and by the methods set forth therein although it is noted that any other conventional method of forming the particles may be employed in accordance with the principles of this invention.

The coated particles generally have a particle size of 400 to 1,000 and may be spherical or somewhat irregular in cross section. Although the above-cited publication refers only to nuclear fuels, it will be understood that fertile materials for use in nuclear reactors can be similarly coated and that coated particles of this type are also included in the scope of the invention although reference may be made from time to time to fuel particles as illustrated.

It has been proposed heretofore to embed coated particles of the aforedescribed type in a body to form fertile elements or fuel elements adapted to be positioned in the core of the nuclear reactor as the reaction-sustaining or breeding material, the binder mixture consisting essentially of graphite particles and synthetic resin which can be cured at a temperature of 180°C to fix the coated particles in place. Elements of this type contain fuel or fertile material and may be further enclosed in a graphite receptacle or may be sheathed in graphite by conventional techniques. Such systems have, however, relatively low densities in terms of the quantity of active material per unit volume and do not always afford effective heat transfer between the interior of the element and the coolant.

With water-cooled and liquid-metal-cooled reactor cores, therefore, it has been suggested to place the coated particles in a loosely piled state within a metallic shell facilitating heat transfer between the contents of the shell and the externally disposed coolant, but nevertheless failing to improve the heat-transfer efficiency between central portions of the contents of the shell and the shell wall. Thus the transfer of heat from the interior of the fuel or breeder element is fraught with difficulties which have not been successfully overcome heretofore.

OBJECTS OF THE INVENTION

It is, therefore, the principal object of the present invention to provide a fuel or fertile element in which the aforementioned disadvantages are obviated and the resulting element can be used with effective cooling in gas-cooled or liquid-cooled nuclear reactors.

It is a further object of our invention to provide low-cost fuel or fertile elements of substantially identical characteristics permitting cooling of the inner regions of the fuel or fertile elements thereby produced.

Another object of the invention is to provide an improved method of operating a nuclear reactor in which the problem of cooling the fuel and fertile elements is reduced or eliminated.

Still another object of our invention is the provision of improved fuel and fertile elements for use in nuclear reactor cores, in which cooling of the active materials is facilitated.

SUMMARY OF THE INVENTION

These objects and others which will become apparent hereinafter, are attained, in accordance with the present invention, with a system whereby the elements constitute graphite casings in which the coated nuclear-fuel and fertile particles are sintered and bonded to a coherent condition, the resulting mass remaining limitedly porous to permit the circulation of a cooling fluid not only around the casings of the fuel or fertile element, but through the interior thereof to obtain the handling and regulating results characteristic of the use of individual fuel and fertile elements, with improved cooling.

According to an important feature of the invention, the coated-particle mass within the graphite or other shell is bonded into a coherent body which, in turn, may be bonded to the inner wall of the shell and has a porosity of the order of 10 to 25 percent (i.e., the pore volume is 10 to 25 percent of the volume of the particles mass) by a progressive sintering or fusion technique whereby a pyrolytically decomposable gas adapted to form binder particles in situ is passed through the loose particle mass in one direction while heating is progressively advance along the mass in the other direction so the pyrolytically precipitated binder substance first formed and thereafter fused to the coated fuel or fertile particles while the gas continues to traverse the mass to leave the system porous but coherent. The pyrolytic deposit is preferably of a material identical with or equivalent to that of the coating of the particles i.e. pyrolitic carbon where the particle coating is of this material or silicon carbide where the coating is SiC or zirconium carbide.

According to the method of the invention, which affords a simple and economical production for fuel and fissionable elements, the fissionable fuel or fertile material is formed into coated particles in which the coating is pyrolytic carbon (graphite) and/or any of the ceramic carbides or oxides disclosed in the aforementioned article, the particles having a particle size of 400 to 1,000μ. The coatings may be carbides such as silicon carbide, zirconium carbide, beryllium carbide, niobium carbide, etc., or oxides such as beryllium oxide, aluminum oxide, magnesium oxide or zirconium oxide. The coated particles in an amount of the order of hundreds to tens of thousands, with a preferred particle size of about 600μ are introduced into an upright graphite shell which is preferably of cylindrical configuration and is formed with a perforated bottom through which the pyrolytically decomposable gas is admitted.

The progressive heating of the mass is effected by an induction-furnace arrangement, according to the invention, the coil of which surrounds the shell and is axially displaceable relative thereto to advance the heating zone from top to bottom. The heating process which requires 1,200° to 2,100°C is designed to form bridges between the coated particle with carbon precipitated from the gas by pyrolysis of a gaseous hydrocarbon such as methane (or another low-molecular weight alkane having 1 to 4 carbon atoms), acetylene and homologues, benzene and its homologues and or with silicon carbide precipitated by breakdown of pyrolyzable silanes, such as the chloromethylsilanes. The gas may include an inert carrier gas such as argon, helium or nitrogen.

The induction coil of the induction furnace is positioned, according to the invention, in axial alignment with the graphite sleeve and thereabove and can be shifted downwardly along the graphite sleeve to progressively displace the pyrolysis zone in the same direction. The gaseous reaction products are driven by the pressure of the gas from below and the subsequent heating of the fused region to leave small interconnected interstices constituting the pores of the mass.

Furthermore, the sleeve may be provided with a multiplicity of small-diameter bores along the walls thereof to facilitate passage of the gaseous reaction products from the mass. The bores, both at the base of the sleeve and in the walls, may have diameters slightly less than the minimum diameter of the coated particles, e.g., up to 400μ. The fuel and fertile elements, according to the invention, manufactured as above and introduced into the nuclear reactor, manifest a significantly more effective cooling throughout the fuel or fertile element when, for example, the reactor is cooled with helium. Overheating of the interior of the elements cannot occur. Furthermore, the coherent porous masses of the fuel or fertile elements are found to be structurally stable even with working temperatures of 1,000°C and above over relatively long operating periods. Another advantage in the system is that the pyrolytically deposited carbon or SiC bridges between the particles impart a thermal conductivity to these bridges which approaches that of the coatings themselves, the bonding particles and the coated-particle sheaths having practically identical coefficients of thermal expansion so that the mass does not break down as a result of temperature variations.

When the connecting bridges between the fuel and breeder particles are to be formed by thermal decomposition or pyrolysis of chloromethylsilanes, they consist in major part of silicon carbide and, in order to insure further the continuity of the coefficient of thermal expansion, it is advisable to employ coated particles in which the sheath consists of silicon carbide. The resistance of the system to corrosion by moisture is reduced. Moreover, the systems using silicon carbide and zirconium carbide have been found to be compatible, both with respect to thermal conductivity and as far as the coefficient of thermal expansion is concerned. Interestingly enough, the process of the present invention can also be applied to uncoated fuel and fertile particles which, accordingly, can be bonded together in a graphite sheath.

DESCRIPTION OF THE DRAWING

The above and other objects, features and advantages of the present invention will become more readily apparent from the following description, reference being made to the accompanying drawing in which.

SPECIFIC DESCRIPTION

Figures 1, 2, 3:
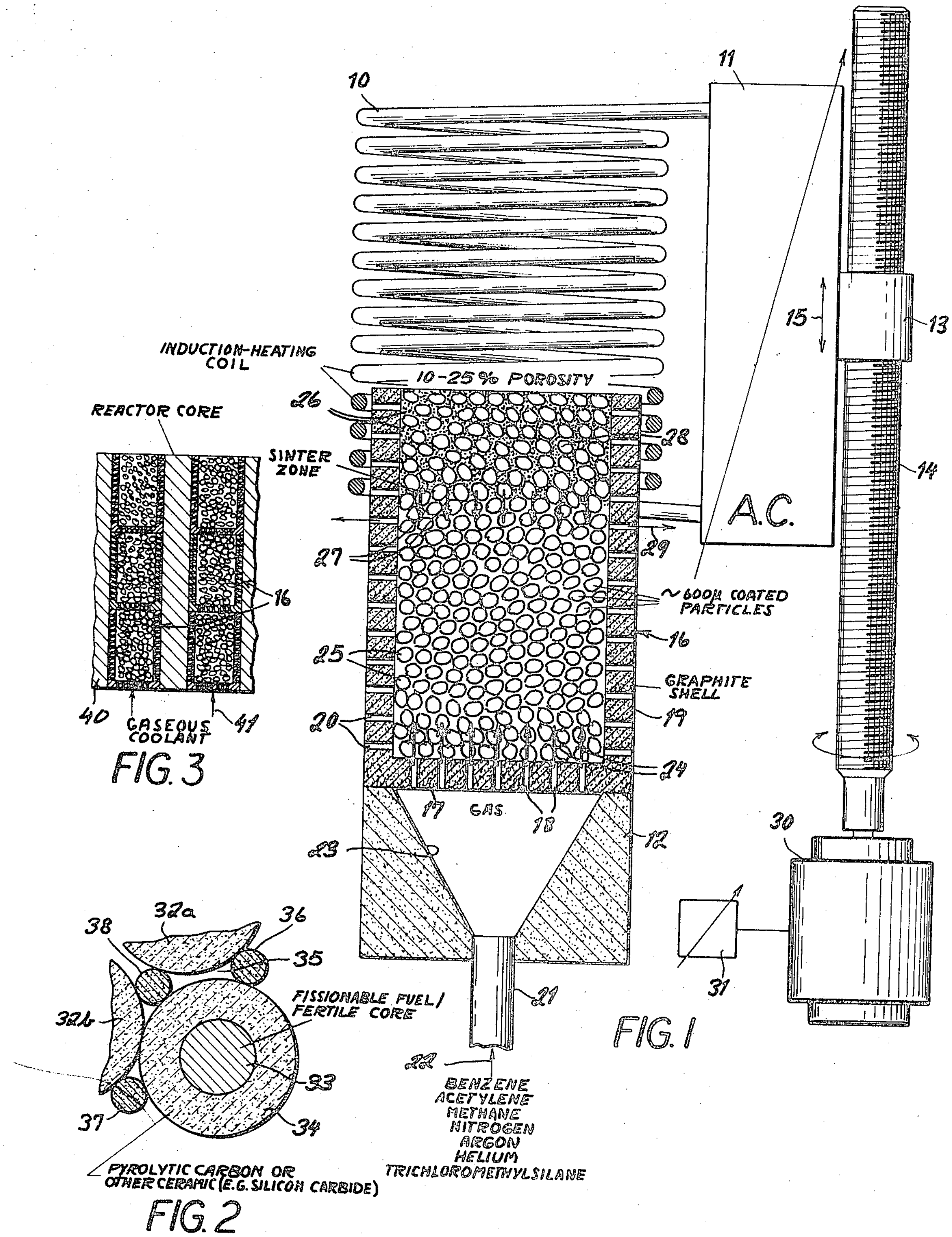
FIG. 1 is a diagram representing the invention and showing the graphite sleeve or casing in diagrammatic form.
FIG. 2 is a diagram illustrating the formation of bridges between the particles.
FIG. 3 diagrammatically illustrates a reactor core provided with fuel elements in accordance with the invention.

In FIG. 1, we show an apparatus for making fissionable-fuel or breeder (fertile) elements for use in a nuclear reactor in accordance with the invention. The apparatus includes a conventional induction furnace wherein, however, the induction coil 10, which is provided with the usual power supply 11, is mounted for axial movement relative to a support 12 by, for example, a nut arrangement 13 engaging a vertical leadscrew 14.

The coil 10 can thus be displaced as represented by the arrow 15 relative to a graphite shell 16 mounted on the support 12. The shell or casing 16 is here shown to be cylindrical but may be of any appropriate configuration, provided it is elongated to permit the reaction zone to be advanced counter to the gas flow as noted earlier. The bottom 17 of the shell 16 is formed with a multiplicity of relatively small bores or perforations 18 (e.g., of a diameter of 300 microns) while the walls 19 may be provided with similar bores or apertures 20 to permit escape of gaseous reaction products.

A gaseous stream is introduced into the shell 16 via the support 12 which is connected to a source 21 of a pyrolytically decomposable gas component, especially methane, acetylene, benzene, or a chloromethyl silane, and to a source of an inert carrier gas (e.g., argon, helium or nitrogen) as represented by the arrow 22, and constitutes a gas distributor 23 communicating with the apertures 18. The carrier gas and the pyrolytically decomposable component flow upwardly (arrows 24).

As the coil 10 is lowered by the leadscrew 14, it heats the coated particles 25 filled into the shell and pyrolytically decomposes the rising gas stream to deposit a decomposition product 26 as the bonding agent or bridge between the coated particles 25.

The pyrolytic-decomposition front moves progressively downwardly (arrow 27) as the coil is lowered. The mass of coated particles and bridging particles behind the pyrolysis front and represented at 28 undergoes fusion to produce a coherent mass of 10 to 25 percent porosity, preferably 15 to 20 percent porosity inclusive. In the region of the pyrolysis front, gaseous reaction products emerge through the walls of the graphite shell as shown at 29. The body 12, forming a nozzle or tube supplying the gas to the reactor element 16, is also composed of graphite. To permit the assembly 10, 11 to move downwardly at a rate sufficiently slow to permit pyrolysis and fusion, the motor 30 of the lead-screw 14 is provided with a speed regulator 31.

In FIG. 2, we have shown the result of the treatment described with reference to FIG. 1 and this Figure thus illustrates a coated particle 32 of a diameter of 400 to 1,000 microns (preferably about 600 microns) with a nuclear reactor fuel or fertile core 33 as described in the aforementioned publication. Between the coating 34 of pyrolytic carbon, silicon carbide, etc., and the adjoining particles 32*a* and 32*b*, there are provided interstices 35 traversed by the gas and sustaining pyrolytic decomposition to produce bridges 36 which fuse to the sheaths of the coated particles at 38. When the coatings are a pyrolytic carbon, the pyrolytically decomposable material is preferably a hydrocarbon such as methane, acetylene or benzene so that the bridge particles 36 likewise are pyrolytic carbon. When, however, the sheaths of the coated particles are composed of silicon carbide, for example, the gas stream contains a methyl-silane so that the bridging particles may be pyrolytic carbon and/or silicon carbide.

The elements 16 may be stacked in a nuclear reactor core 40 into which a gaseous coolant, (e.g., helium) is forced at 41, the helium penetrating the perforated walls of the casing and extending to the innermost portions of the porous mass to effect efficient cooling of the reactor elements.

SPECIFIC EXAMPLES

EXAMPLE I

In a graphite shell whose bottom is formed with a multiplicity of relatively small bores of a diameter less than that of the coated particles to be employed, there is placed a loose mass of nuclear-fuel particles having an approximately uniform diameter of about 600 microns. This shell is connected with a supply pipe for the delivery of a gas mixture 1:1 (volume) of methane and argon. The graphite sleeve is, as described in connection with FIG. 1, heated at its upper end by the induction coil to a temperature of about 1,500°C. The induction coil is lowered slowly over a period of 1 hour from the upper end of the graphite sleeve to the lower end thereof. The sleeve is thus entirely enclosed. Pyrolytic decomposition of methane and precipitation of carbon results in the bonding of the mass into a coherent structure containing a network of interconnected pores or interstices such that the body has a porosity of about 15 percent and the flow resistance of the gas across the element is increased to a level between 0.190 and 0.326 kp/cm$^2$.

EXAMPLE II

Using the same device as in Example I, 600 micron particles, coated with pyrolytic graphite or silicon carbide are treated with a hydrogen stream saturated with trichloromethylsilane at a temperature of 20°C. This gas stream is mixed with argon in a ratio of 1:1. Again, a porosity between 15 and 20 percent is obtained and the coherent body is formed by bridging particles of silicon carbide.

We claim:

1. A fissionable-fuel element for use in a nuclear reactor comprising a mass of large particles of a material selected from the group which consists of fissionable-fuel or fertile material, said large particles being bonded together by non-fissionable small particles deposited pyrolytically in situ within said mass, said large particles each having a particle size of 400 to 1,000 microns and being composed of a core of said material, encompassed by a sheath selected from the group which consists of pyrolytic carbon, beryllia, magnesia, zirconia, alumina, silicon carbide, zirconium carbide and niobium carbide, said small particles consisting of a substance selected from the group which consists of pyrolytic carbon, silicon carbide and zirconium carbide and said small particles having a particle size substantially less than that of said large particles.

2. The element defined in claim 1, further comprising a porous graphite shell receiving said mass and said small particles, said large particles being bonded together in situ within said shell.

3. The element defined in claim 2 wherein said shell has perforated walls.

* * * * *